United States Patent [19]
Evans

[11] Patent Number: 5,720,367
[45] Date of Patent: Feb. 24, 1998

[54] PARKING AND EMERGENCY BRAKE OPERATING MECHANISM FOR DUAL MODE DRUM BRAKE ASSEMLBY

[75] Inventor: Anthony C. Evans, Northville, Mich.

[73] Assignee: Kelsey-Hayes Company, Livonia, Mich.

[21] Appl. No.: 703,599

[22] Filed: Aug. 23, 1996

Related U.S. Application Data

[60] Provisional application No. 60/002,718, Aug. 23, 1995.

[51] Int. Cl.[6] .................................... F16D 51/06
[52] U.S. Cl. .................. 188/79.64; 188/325; 74/502.4
[58] Field of Search .................. 188/2 D, 78, 79.54, 188/79.57, 79.65, 79.64, 325, 327–341, 106 A, 106 F; 74/471 R, 501.5 R, 502.4, 502.5, 502.6

[56] References Cited

U.S. PATENT DOCUMENTS

| | | |
|---|---|---|
| 1,829,307 | 10/1931 | Sneed . |
| 1,962,081 | 6/1934 | Krieg . |
| 1,994,823 | 6/1935 | Kohr ........................ 188/327 |
| 2,006,494 | 7/1935 | Beudix et al. ............ 188/106 A |
| 2,259,266 | 10/1941 | Rabe . |
| 3,023,853 | 3/1962 | Nawrot . |
| 3,498,419 | 3/1970 | Belart . |
| 3,708,044 | 1/1973 | Torri et al. . |
| 3,709,334 | 1/1973 | Kondo et al. . |
| 3,870,131 | 3/1975 | Firth et al. . |
| 4,018,312 | 4/1977 | Muramoto et al. . |
| 4,678,067 | 7/1987 | Thompson . |
| 4,887,698 | 12/1989 | Hunt et al. ................ 188/325 |
| 5,070,968 | 12/1991 | Evans . |
| 5,275,260 | 1/1994 | Evans et al. . |
| 5,322,145 | 6/1994 | Evans . |

FOREIGN PATENT DOCUMENTS 2055413  5/1972  Germany .

Primary Examiner—Chris Schwartz
Attorney, Agent, or Firm—MacMillan, Sobanski & Todd

[57] ABSTRACT

A dual mode drum brake assembly includes a backing plate, a brake drum, and first and second brake shoes supported on the backing plate and movable into frictional engagement with the brake drum. The drum brake assembly further includes a service brake mechanism for selectively moving the brake shoes into frictional engagement with the brake drum, and a rotation preventing abutment secured relative to the backing plate and disposed between and engageable with the brake shoes. A pivot lever is pivotally supported relative to the first brake shoe and is operatively coupled to exert an outward force on the first brake shoe when the parking and emergency brake is actuated. A first strut is disposed adjacent the hydraulic actuator and includes one end coupled to the second brake shoe and opposite end coupled to one end of the pivot lever. A second strut is disposed adjacent the rotation preventing abutment and includes one end coupled to the second brake shoe and an opposite end coupled to an opposite end of the pivot lever. The drum brake assembly further includes an actuation cable having an end portion supported in a generally perpendicular relationship relative to the backing plate, and a parking and emergency brake actuating means carried by the brake assembly and coupled to the actuation cable for mechanically actuating the pivot lever to urge the first brake shoe outwardly into engagement with the brake drum and thereby initiate duo-servo actuation of the parking and emergency brake through one of the first and second struts.

10 Claims, 4 Drawing Sheets

PARKING AND EMERGENCY BRAKE OPERATING MECHANISM FOR DUAL MODE DRUM BRAKE ASSEMLBY

BACKGROUND OF THE INVENTION

This invention relates in general to vehicle drum brake assemblies and in particular to an improved parking and emergency brake, operating mechanism which can be effectively used in a "dual mode" drum brake assembly.

Most vehicles are equipped with a brake system for retarding or stopping movement of the vehicle in a controlled manner. A typical brake system for an automobile or light track includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A dual mode drum brake assembly includes a hydraulically actuated service brake of the leading/trailing type, and a mechanically actuated parking and emergency brake of the duo-servo type. A conventional dual mode drum brake assembly includes a backing plate which is secured to a fixed, non-rotatable component of the vehicle, such as the vehicle axle housing. A pair of opposed arcuate brake shoes are supported on the backing plate for selective movement relative thereto.

The dual mode drum brake assembly further includes a cylindrical brake drum which is secured to the vehicle wheel for rotation therewith. The interior of the brake drum is hollow, defining an inner cylindrical braking surface. The brake drum is disposed adjacent to the backing plate such that the brake shoes extend within the hollow cylindrical interior thereof. To effect braking action, the brake shoes are moved outwardly apart from one another so as to frictionally engage the inner cylindrical braking surface of the brake drum. Such frictional engagement causes retarding or stopping of the rotational movement of the brake drum and, therefore, the wheel of the vehicle in a controlled manner.

One or more actuating mechanisms are provided in the dual mode drum brake assembly for selectively moving the brake shoes outwardly apart from one another into frictional engagement with the inner braking surface of the brake drum. Usually, a hydraulic or pneumatic service brake mechanism is provided for selectively actuating the dual mode drum brake assembly under normal operating conditions. Such a service brake mechanism can include a hydraulic cylinder having a pair of opposed pistons which abut and move the brake shoes apart from one another into frictional engagement with the inner braking surface of the brake drum.

A mechanically actuated duo-servo parking and emergency brake mechanism is also provided for manually selectively actuating the dual mode drum brake assembly. The parking and emergency brake mechanism can include an actuating lever pivotally supported on a lower strut disposed between the brake shoes, and a pivot lever pivotally supported on one of the brake shoes and operatively connected to the actuating lever. The actuating lever is connected to an actuation cable which, when pulled, is operative to move the brake shoes apart from one another into frictional engagement with the inner braking surface of the brake drum.

Typically in a dual mode drum brake assembly, the actuation cable is oriented generally parallel to a backing plate or perpendicular to the axle of the brake assembly. U.S. Pat. No. 5,070,968 to Evans discloses a prior art dual mode drum brake assembly having a parking and emergency brake actuation cable which is oriented generally parallel to the backing plate of the vehicle. However, in some vehicle designs, due to the arrangement and size of various components, it is not possible to orient the parking and emergency brake cable parallel to the backing plate. U.S. Pat. No. 4,018,312 to Muramoto et al., U.S. Pat. No. 3,870,131 to Firth et al., U.S. Pat. No. 3,023,853 to Nawrot, U.S. Pat. No. 2,259,266 to Rabe, and U.S. Pat. No. 2,006,494 to Bendix et al. disclose prior art drum brake assemblies having a parking and emergency brake actuation cable which is oriented generally parallel to the backing plate of the vehicle.

SUMMARY OF THE INVENTION

This invention relates to a drum brake assembly having a leading/trailing service brake and a duo-servo parking and emergency brake and includes a backing plate and a brake drum. First and second brake shoes are supported on the backing plate and are movable into frictional engagement with the brake drum. Each of the first and second brake shoes includes a web portion, a table portion secured to the web portion, and a friction pad secured to the table portion. The drum brake assembly further includes a service brake mechanism for selectively moving the brake shoes into frictional engagement with the brake drum. A rotation preventing abutment is secured relative to the backing plate and disposed between and engageable with the brake shoes. A pivot lever is pivotally supported relative to the first brake shoe and is operatively coupled to exert an outward force on the first brake shoe when the parking and emergency brake is actuated. A first strut means is disposed adjacent the hydraulic actuator and includes one end coupled to the second brake shoe and an opposite end coupled to one end of the pivot lever. A second strut means is disposed adjacent the rotation preventing abutment and includes one end coupled to the second brake shoe and an opposite end coupled to an opposite end of the pivot lever. According to the present invention, the drum brake assembly includes an actuation cable having an end portion supported in a generally perpendicular relationship relative to the backing plate, and a parking and emergency brake actuating means carried by the brake assembly and coupled to the actuation cable for mechanically actuating the pivot lever to urge the first brake shoe outwardly into engagement with the brake drum and thereby initiate duo-servo actuation of the parking and emergency brake through said first strut means.

Other objects and advantages of this invention will become apparent to those skilled in the art from the following detailed description of the preferred embodiment, when read in light of the accompanying drawings.

DESCRIPTION OF THE PREFERRED EMBODIMENT

Figure 1:
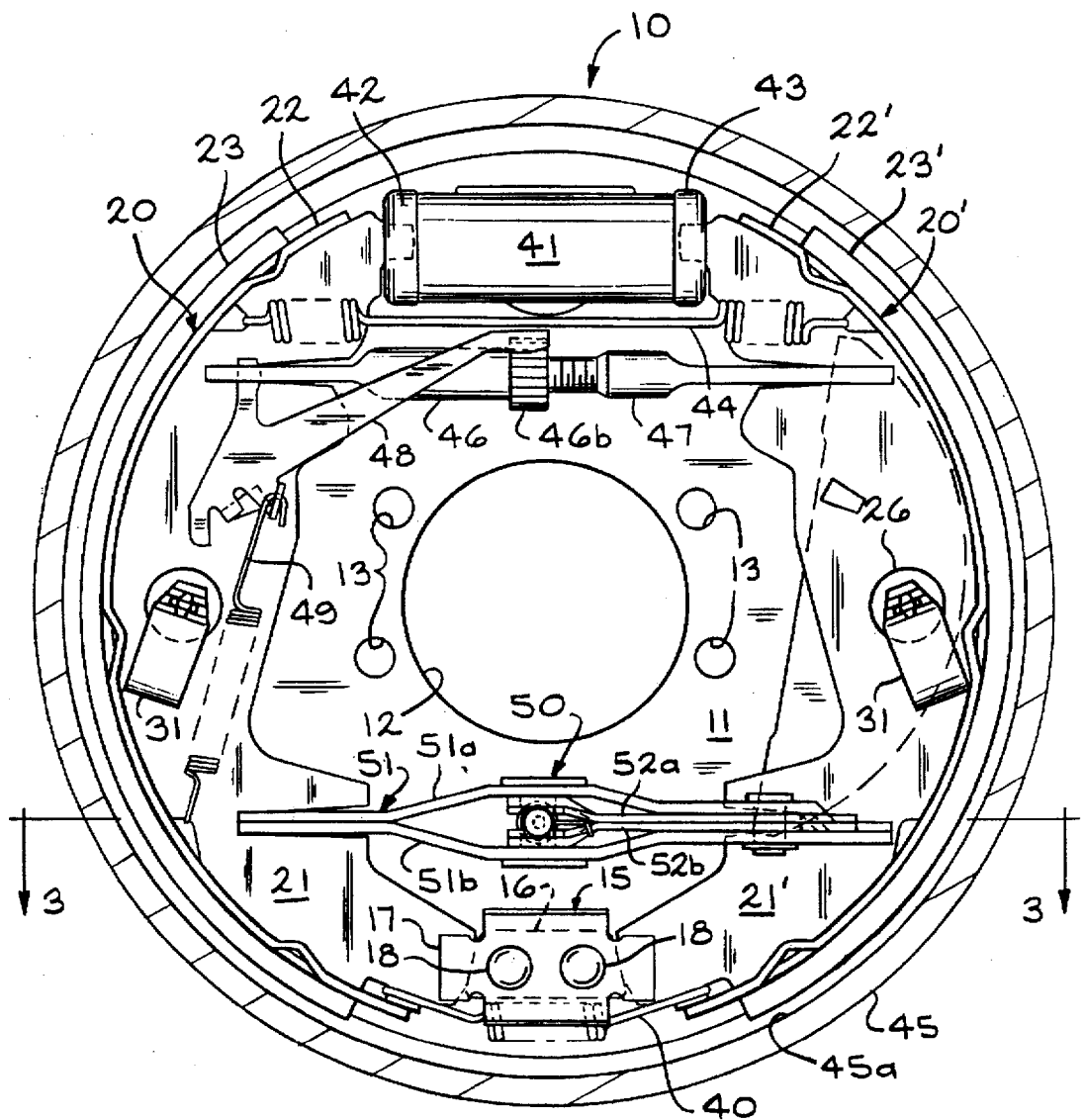
FIG. 1 is a side elevational view of a portion of a dual mode drum brake assembly including an improved parking and emergency brake operating mechanism in accordance with the present invention.

Referring now to the drawings, there is illustrated in FIG. 1 a portion of a dual mode drum brake assembly, indicated generally at 10, in accordance with this invention. The dual mode drum brake assembly 10 includes a hydraulically actuated service brake of the leading/trailing type, and a mechanically actuated parking and emergency brake of the duo-servo type. The dual mode drum brake assembly 10 is associated with a rear wheel of the vehicle. The general structure and operation of the dual mode drum brake assembly 10 is conventional in the art. Thus, only those portions of the dual mode drum brake assembly 10 which are necessary for a full understanding of this invention will be explained and illustrated in detail.

The illustrated dual mode drum brake assembly 10 includes a rigid backing plate 11 which is generally flat and circular in shape. The backing plate 11 is adapted to be secured to a fixed, non-rotatable component of the vehicle, such as an outer end of a housing (not shown) for enclosing a rotatable axle. To accomplish this, a relatively large opening 12 is formed through the central portion of the backing plate 11. The central opening 12 is provided to permit the outer end of the axle housing to extend therethrough to the driven vehicle wheel (not shown). A plurality of relative small holes 13 are also formed through the backing plate 11, located about the central opening 12. The small holes 13 are provided to permit threaded bolts (not shown) to extend therethrough to secure the backing plate 11 to the outer end of the axle housing.

An abutment block assembly, indicated generally at 15, is provided on the outer surface of the backing plate 11. The abutment block assembly 15 includes an inner spacer plate 16, which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The drum brake assembly 10 includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the opposed outer curved surfaces of the web portions 21 and 21', such as by welding. A friction pad 23 is secured to the outer arcuate surface of the table portion 22 of the brake pad 20, while a friction pad 23' is secured to the outer arcuate surface of the table portion 22' of the brake pad 20'.

Figure 2:
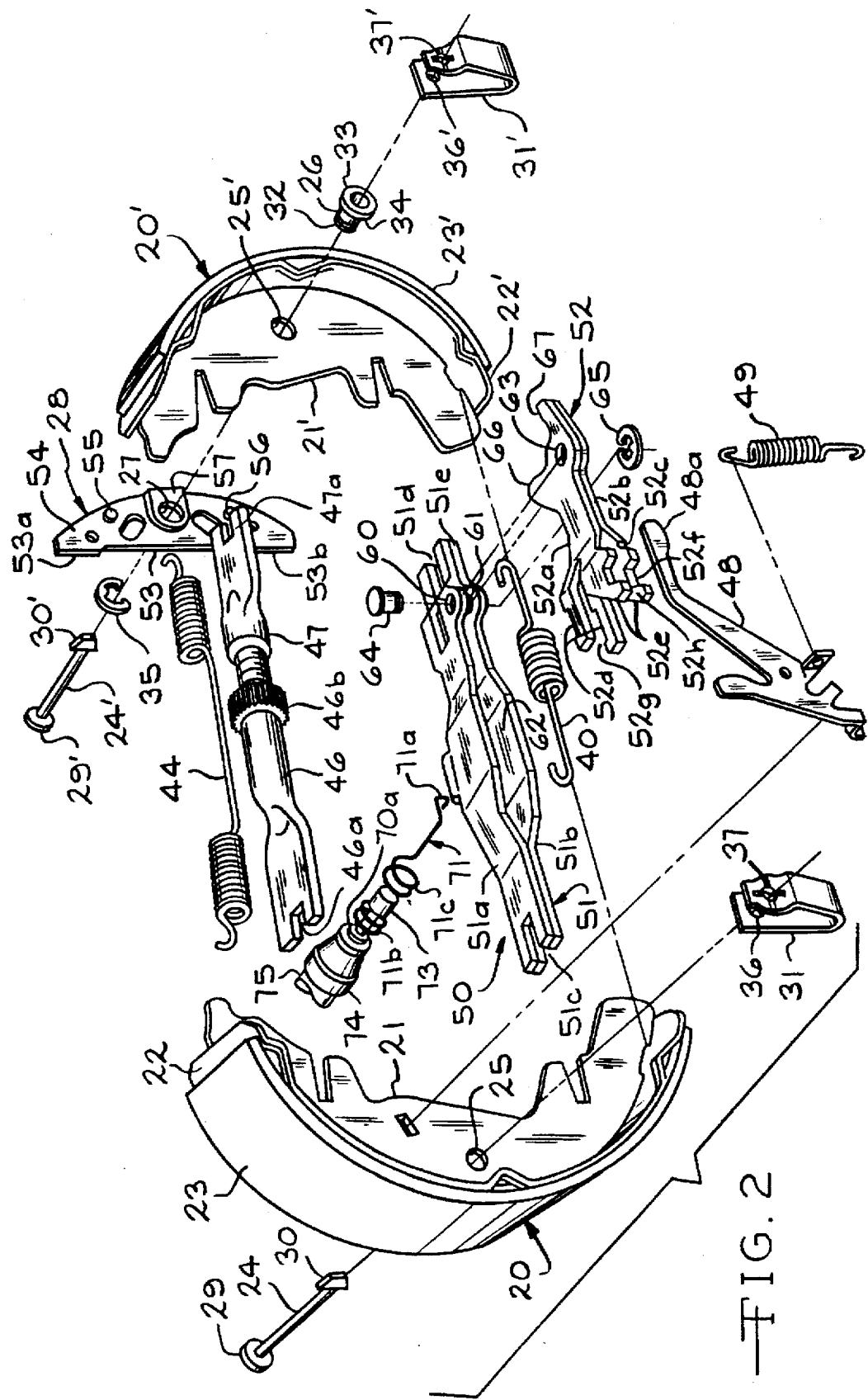
FIG. 2 is an exploded perspective view of some of the parts of the drum brake assembly shown in FIG. 1.

The first and second brake shoes 20 and 20' are supported on the backing plate 11 by pins 24 and 24', respectively, best shown in FIGS. 2. The pins 24 and 24' extend through apertures 25 and 25', respectively, formed in the webs 21 and 21' of the brake shoes 20 and 20'. As will be discussed, the pin 24' also extends through a hollow pivot sleeve 26 which is inserted in a centrally located aperture 27 formed in a pivot lever 28 and the aperture 25' of the web 21' of brake shoe 20', in order to pivotally support the pivot lever 28 on brake shoe 20'.

As shown in FIG. 2, the pins 24 and 24' are provided with enlarged heads 29 and 29' at one ends, and with flattened, wedge-shaped opposite ends 30 and 30', respectively. The enlarged head 29 of the pin 24 engages the inboard side of the backing plate 11. The body portion of the pin 24 extends through the aperture 25 in the web 21 of brake shoe 20 and through a generally U-shaped spring clip retainer 31. In a similar manner, the enlarged head 29' of the pin 24' engages an inboard side of the backing plate 11. The body portion of the pin 24' extends through the hollow pivot sleeve 26 installed in the aperture 25' in the web 21' of brake shoe 20', through the aperture 27 in the pivot lever 28, and through a generally U-shaped spring clip retainer 31' to pivotally support the pivot lever 28 on the web 21' of brake shoe 20'.

The hollow pivot sleeve 26 includes a generally cylindrical elongated body having a first portion 32 which defines a first outer diameter and a second portion 33 which defines a second outer diameter greater than the first outer diameter. A shoulder 34 is defined between the first portion 32 and the second portion 33. The first portion 32 provides a bearing surface for allowing the pivot lever 28 to pivot relative to the brake shoe 20' and, as will be discussed below, for transmitting force from the pivot lever 28 to the web 21'. The shoulder 34 engages the outboard side of the web 21' of the brake shoe 20' (not illustrated). An E-clip fastener 35 is installed in a groove provided in the first portion 32 of the hollow pivot sleeve 28 to retain the pivot lever 28 adjacent the web 21' of the brake shoe 20'.

The U-shaped spring-clip retainers 31 and 31' are provided with respective apertures 36 and 36' and a pair of slots 37 and 37'. During assembly the flattened, wedge-shaped ends 30 and 30' of the pins 24 and 24' are initially inserted through the apertures 36 and 36' and the slots 37 and 37', then are turned ninety degrees while the spring-clip retainers 31 and 31' are compressed. The spring-clip retainers 31 and 31' are then released, and the wedge-shaped ends 30 and 30', respectively, are received within depressions formed in the slots 37 and 37' of the spring-clip retainers 31 and 31' to secure the brake shoes 20 and 20' to the backing plate 11.

As shown by the dotted lines in FIG. 1, the lower ends of the web portions 21 and 21' of the brake shoes 20 and 20' are slightly curved. The curved lower ends of the web portions 21 and 21' are received between the backing plate 11 and the retainer plate 17 and extend into abutment with the opposed side surfaces of the spacer plate 16. A first coiled spring 40 has hooked ends which extend through respective openings formed near the lower ends of the web portions 21 and 21' so as to urge such lower ends thereof into abutment with the opposed side surfaces of the spacer plate 16.

The drum brake assembly 10 further includes a hydraulic actuator 41 which is secured to the backing plate 11 between the upper ends of the web portions 21 and 21' of the brake shoes 20 and 20', respectively. The hydraulic actuator 41 includes a pair of opposed pistons 42 and 43 which respectively abut the upper ends of the web portions 21 and 21'. A second coiled spring 44 has hooked ends which extend through respective openings formed near the upper ends of the web portions 21 and 21' so as to urge such upper ends thereof into abutment with the pistons 42 and 43. The hydraulic actuator 41 is connected to a conventional source of pressurized hydraulic fluid (not shown) for operating the drum brake assembly 10.

The dual mode brake drum assembly 10 further includes a hollow cylindrical brake drum 45 which is secured to a wheel (not shown) of the vehicle for rotation therewith. The interior of the brake drum defines an inner cylindrical braking surface 45a. When installed, the brake drum 45 is disposed adjacent to the backing plate 11 such that the brake shoes 20 and 20' extend within the inner cylindrical braking surface 45a. To effect braking action, the brake shoes 20 and 20' are moved outwardly apart from one another so as to frictionally engage the inner cylindrical braking surface 45a of the brake drum 45. Such frictional engagement causes retarding or stopping of the rotational movement of the brake drum 45 and, therefore, the wheel of the vehicle in a controlled manner.

The hydraulic actuator 41 is used to operate the brake drum assembly 10 under normal service conditions. When it is desired to actuate the drum brake assembly 10, pressurized hydraulic fluid is supplied to the hydraulic actuator 41. Typically, this is accomplished by the operator of the vehicle depressing the brake pedal in the driver compartment of the vehicle. When such pressurized hydraulic fluid is supplied to the hydraulic actuator 41, the pistons 42 and 43 are moved apart from one another. As a result, the upper ends of the brake shoes 20 and 20' are also moved apart from one another, essentially pivoting about the abutment block assembly 15. This movement causes the friction pads 23 and 23' to move into frictional engagement with the inner cylindrical braking surface 45a of the brake drum 45. The abutment block assembly 15 functions to transfer the braking torque from the leading brake shoe (i.e., the left brake shoe 20 when the brake drum 45 is rotating in a counter-clockwise direction) to the frame of the vehicle.

When the brake shoes 20 and 20' are moved apart from one another, the first and second coiled springs 40 and 44 are expanded. Thus, when the pressurized hydraulic fluid to the hydraulic actuator 41 is subsequently released, the springs 40 and 44 retract the brake shoes 20 and 20' inwardly toward one another and out of frictional engagement with the inner cylindrical braking surface 45a of the brake drum 45 as illustrated in FIG. 1.

The drum brake assembly 10 includes an automatic brake adjusting mechanism to compensate for thinning of the friction pads 23 and 23' resulting from wear caused by repeated use. The illustrated automatic brake adjusting mechanism is conventional in the art and includes a pair of mutually threaded struts 46 and 47 having opposed slotted ends 46a and 47a, respectively. The upper end of web portion 21 of brake shoe 20 is received within the slotted end 46a of strut 46. The upper end of the web portion 21' of brake shoe 20' and the upper end of the pivot lever 28 is received in the slotted end 47a of strut 47. A star wheel portion 46b is formed integrally on the strut 42.

An adjuster lever 48 is pivotally mounted on the web portion 21 of the brake shoe 20. The adjuster lever 48 has a protruding arm portion 48a which extends into cooperation with the star wheel portion 46b of the strut 46. A third coiled spring 49 has hooked ends which extend through respective openings formed through the adjuster lever 48 and the lower end of the web portion 21 so as to urge the protruding arm portion 48a of the adjuster lever 48 into engagement with the star wheel portion 46b of the strut 46.

As is known, when the brake shoes 20 and 20' are moved outwardly apart from one another to frictionally engage the inner cylindrical braking surface 45a of the brake drum 45, the adjusting lever 48 is pivoted. When a sufficient amount of wear has occurred on the friction pads 23 and 23', the adjusting lever 48 will be pivoted a sufficient amount so as to rotate the star wheel portion 46b and the strut 46 relative to the strut 47. Such relative rotation causes the opposed ends of the struts 46 and 47 to be moved slightly farther apart from one another, together with the associated upper ends of the brake shoes 20 and 20'. Thus, the automatic adjusting mechanism functions to maintain a predetermined clearance between the friction pads 23 and 23' of the brake shoes 20 and 20', respectively, and the inner cylindrical braking surface 45a of the brake drum 45 as wear occurs during operation of the drum brake assembly 10. The construction of the dual mode drum brake assembly thus far described is conventional in the art.

A parking and emergency brake operating mechanism 50 of the present invention includes a composite lower link or strut 51, an actuating lever 52, and the pivot lever 28. The pivot lever 28 includes a generally flat edge surface 53, a main body 54 preferably having a pair of upstanding dimples 55 and 56, a raised generally U-shaped portion 57, and the aperture 27 formed therein. The aperture 27 is equally spaced between opposed ends of the pivot lever 28, and the dimples 55 and 56 are equally spaced relative to the aperture 27. The ends of the pivot lever 28 are identical and include generally flat edge surfaces 53a and 53b which are non-planar relative to the flat edge surface 53. The flat edge surfaces 53a and 53b operatively connect the pivot lever 28 to the strut 47 and the actuating lever 52, respectively. When the pivot lever 28 is pivotally connected to the web portion 21' of brake shoe 20', only the dimples 55 and 56 and the raised portion 57 engage the inboard side of the web portion 21'. As a result of this, only a relatively small surface contact area is established between the pivot lever 28 and the web portion 21' thereby reducing the frictional forces between the pivot lever 28 and the web portion 21'.

Figure 3:
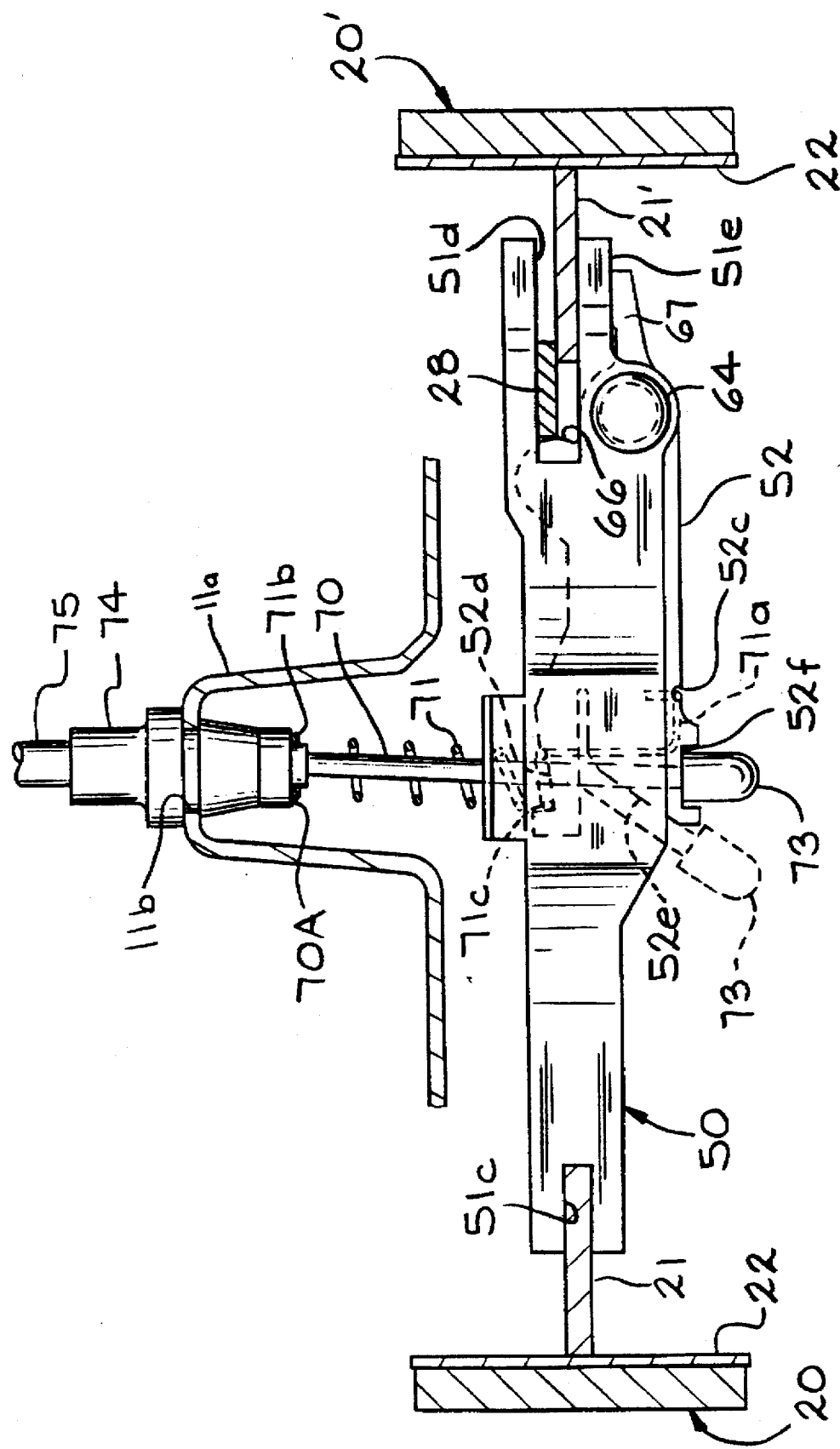
FIG. 3 is a cross-sectional view taken along line 3—3 of FIG. 1.

The composite lower strut 51 includes an upper link 51a and a lower link 51b which are joined together by a suitable means, such as for example, by welding. Each of the links 51a and 51b is slotted at opposed ends thereof, and cooperate to define a left hand slot 51c and a right hand slot 51d therein. As best shown in FIG. 3, the web portion 21 of brake shoe 20 is received in the left hand slot 51c of the lower strut 51, and the web 21' of brake shoe 20' and the pivot lever 28 are received in the right hand slot 51d the lower strut 51.

The upper link 51a of the lower strut 51 includes an aperture 60 formed therein, and the lower link 51b includes an aperture 61 formed therein and which is concentric with the aperture 60. The middle sections of the upper and lower links 51a and 51b are spaced apart from one another and define a cavity or opening 62 for receiving the actuating lever 52.

The actuating lever 52 includes an upper link 52a and a lower link 52b which are joined together by a suitable means, such as for example, by welding. The left ends of the links 52a and 52b are spaced apart from one another and define a first opening or cavity 52g, and a second opening 52h which is smaller than the first opening 52g for a purpose to be discussed below. The actuating lever 52 includes an aperture 63 formed therein. A pin 64 having an enlarged head extends through the apertures 60 and 61 of the links 51a and 51b, respectively, and through the aperture 63 of the actuating lever 52 to pivotally mount the actuating lever 52 on the lower strut 51. An E-clip fastener 65 is installed on an grooved end of the pin 64 to secure the actuating lever 51 on the strut 51.

The actuating lever 52 includes a first arm 66 and a second arm 67. The first arm 66 defines an actuating arm and is disposed adjacent the edge surface 53b of the pivot lever 28. The second arm 67 defines an abutment and normally engages an outboard side surface 51e of the lower strut 51 when the actuating lever 52 is in its inoperative position, as shown in FIG. 3.

The parking and emergency brake operating mechanism 50 further includes an actuation cable 70 which extends through an opening 11a provided in an offset or "draw"

portion 11a of the backing plate 11. A return spring 71 encircles the cable 70, as shown in FIG. 3. In particular, a hooked end 71a of the spring 71 is disposed in a slot 52c formed in the lower link 52b of the actuating lever 52, and opposed ends 71b and 71c of a coiled portion of the spring 71 are disposed between an inboard spring seat 52d of the actuating lever 52 and a spring seat 70a provided on the cable 70, respectively. The cable 70 includes a nipple 73 secured on the end thereof. An elastomeric seal 74 is provided to seal an opening 11b in the backing plate 11, and the cable 70 includes a protective covering or sheath 75.

During assembly, the cable 70 is inserted through the opening 11b of the backing plate 11, the opening 62 of the lower strut 51, and then through the opening 52g of the actuating lever 52. Since the nipple 73 is sized larger than the opening 52h of the actuating lever 52, as the cable 70 is further inserted, the nipple 73 engages a ramped surface 52e provided on the links 52a and 52b of the lever 52 and is deflected as shown in phantom in FIG. 3. Upon further insertion of the cable 70, the nipple 73 will "spring back" causing the nipple 73 to be received in an outboard seat 52f formed in the actuating lever 52. In this position, the return spring 71 normally biases the cable 70, and therefore the actuating lever 52 to the inoperative position, shown in FIG. 3, wherein the brake shoes 20 and 20' do not operatively engage the inner braking surface 45a of the brake drum 45.

The actuation cable 70 is connected to a hand operated lever or similar manually operable parking and emergency brake mechanism (not shown) for selectively actuating the drum brake assembly 10. When this occurs, the actuation cable 70 is pulled in a direction generally perpendicular to the backing plate 11 when viewing FIG. 3. This causes the actuating arm 66 of the actuating lever 52 to pivot clockwise about the pin 64 resulting in the pivot lever 28 pivoting counterclockwise about the pivot sleeve 26. As a result, the upper end of the pivot lever 28 forces the upper strut 46 to the left when viewing FIG. 1 into positive engagement with web portion 21 of brake shoe 20. Also, the actuating lever 52 is effective to move the right end of the lower strut 51 to the left when viewing FIG. 3, to force the lower strut 51 into positive engagement with the lower end of the web portion 21 of brake shoe 20.

In addition to the pivot lever 28 pivoting counterclockwise about the pivot sleeve 26, the pivot lever 28 is operative to exert a radial outward force on the brake shoe 20' via the pivot sleeve 26. Thus, when the actuation cable 70 is pulled, the left end of the upper strut 46 and the left end of the lower strut 51 force the brake shoe 20 into frictional engagement with the inner brake surface 45a of the brake drum 45, and the pivot sleeve 26 forces the brake shoe 20' into frictional engagement with the inner brake surface 45a of the brake drum 45.

Figure 4:
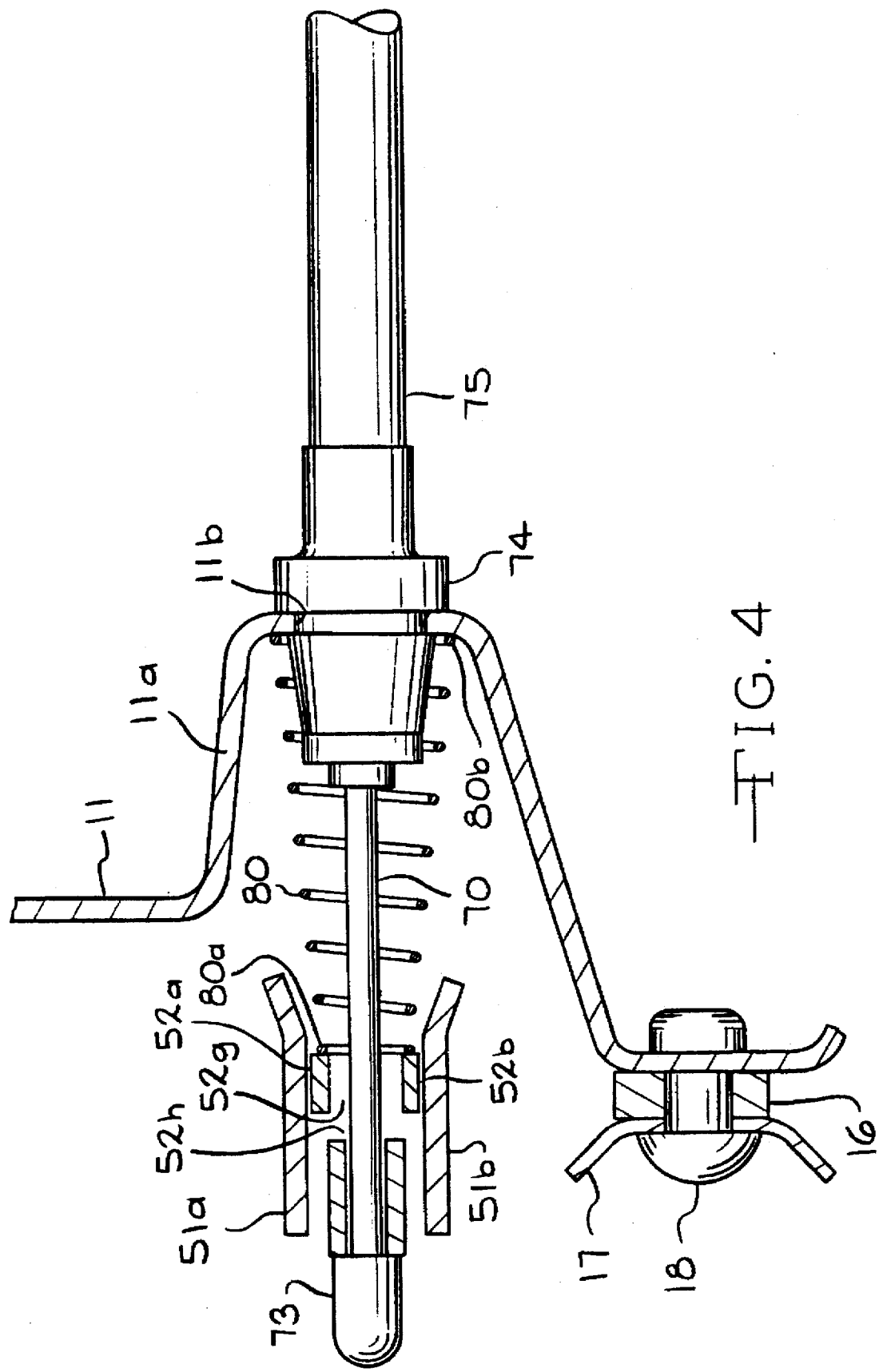
FIG. 4 is a cross-sectional view of an alternate embodiment of a parking and emergency brake operating mechanism.

FIG. 4 illustrates an alternate embodiment of this invention. In this embodiment, a return spring 80 having an increasing diameter coiled portion encircles the actuation cable 70, as opposed to return spring 71. In addition, the coiled end 80b of the spring 80 abuts the backing plate 11, as opposed to the coiled end 71b of the spring 71 abutting the cable seat. As a result of this, the draw 11a formed in the backing plate 11 is reduced and also, the parking and emergency brake operating mechanism 50 is located axially nearer to the backing plate 11.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. An operating mechanism adapted for use in a drum brake assembly having a pair of brake shoes supported relative a backing plate and selectively moveable into frictional engagement with a brake drum comprising:

a composite strut adapted to be supported relative to the brake shoes, said composite strut having a long dimension and a short dimension and including an upper link and a lower link, said upper and lower links including slotted opposed ends adapted to receive respective portions of the brake shoes, said upper link includes a first aperture formed therein and said lower link includes a second aperture formed therein which is concentric with said first aperture, said upper and lower links of said composite strut including sections which are spaced apart from one another to define a composite strut cavity;

an actuating lever having a long dimension and a short dimension and pivotally supported relative to said composite strut, said long dimension of said actuating lever disposed substantially within the confines of said composite strut cavity and said long dimension of said actuating lever extending in the same direction as said long dimension of said composite strut, said actuating lever including a third aperture formed therein wherein said actuating lever is a composite actuating lever comprised of an upper link and a lower link adjacent ends of which are joined at one end and define an actuating lever cavity therebetween at an opposite end thereof to accomodate said actuation cable;

a fastener extending through said first, second and third apertures to pivotally support said actuating lever relative to said composite strut; and an actuation cable having an end portion operatively connected to said actuating lever in a generally perpendicular relationship relative to the backing plate.

2. A drum brake assembly having a leading/trailing service brake and a duo-servo parking and emergency brake and adapted to selectively frictionally engage a brake drum comprising:

a backing plate adapted to secure the drum brake assembly to a vehicle component;

first and second brake shoes supported relative to said backing plate;

a service brake mechanism supported relative to said backing plate and disposed between a first pair of adjacent ends of said brake shoes, said service brake mechanism adapted to selectively move said brake shoes into frictional engagement with the brake drum;

a rotation preventing abutment supported relative to said backing plate, said rotation preventing abutment disposed between and engageable with a second pair of adjacent ends of said brake shoes opposite said first pair of adjacent ends;

a pivot lever pivotally supported relative to said first brake shoe and operatively coupled to exert an outward force on said first brake shoe when the parking and emergency brake is actuated;

a first strut supported relative to said backing plate, said first strut including a first end coupled to said second brake shoe and a second end coupled to one end of said pivot lever;

a second strut disposed adjacent said rotation preventing abutment and including a first end coupled to said second brake shoe and a second end coupled to an opposite end of said pivot lever, said second strut having a long dimension and a short dimension and including an upper link and a lower link, said upper and lower links having sections which are spaced apart from one another to define a cavity within said second strut;

parking and emergency brake actuating means supported relative to said backing plate and operatively coupled to said actuation cable for mechanically actuating said pivot lever to urge said first brake shoe outwardly into engagement with the brake drum and thereby initiate duo-servo actuation of the parking and emergency brake through one of said first and second struts, said parking and emergency brake actuating means including an actuating lever having a long dimension and a short dimension and pivotally supported relative to said second strut, said long dimension of said actuating lever disposed substantially within the confines of said second strut cavity and said long dimension of said actuating lever extending in the same direction as said long dimension of said second strut wherein said actuating lever is a composite actuating lever comprised of an upper link and a lower link adjacent ends of which are joined at one end and define an actuating lever cavity therebetween at an opposite end thereof, said cavity actuating lever cavity including a first opening and a second opening which is smaller than said first opening; and an actuation cable having an end portion operatively connected to said actuating lever in a generally perpendicular relationship relative to said backing plate.

3. The drum brake assembly defined in claim 2 wherein said upper and lower links of said composite actuating lever include a ramped surface adjacent said second opening.

4. The drum brake assembly defined in claim 3 wherein said actuation cable includes a return spring which encircles said actuation cable and a nipple secured on an outer end thereof, said return spring including a hooked end which is disposed in a slot formed in said second strut, said nipple being of a predetermined size such that during assembly said nipple passes through said second strut cavity and said first opening of said actuating lever cavity whereby said nipple engages said ramped surface of said first and second links of said composite actuating lever and is deflected as said actuation cable is further inserted whereby said nipple spring backs and is received in an outboard seat provided in said composite actuating lever.

5. The drum brake assembly defined in claim 2 wherein said service brake mechanism includes a hydraulic actuator having a pair of opposed pistons which respectively abut said first pair of adjacent ends of said brake shoes.

6. The drum brake assembly defined in claim 2 and further including a first spring having hooked ends which extend through respective openings formed near said first pair of adjacent ends of said brake shoes so as to urge said first pair of adjacent ends of said brake shoes respectively into abutment with opposed ends of said rotation preventing abutment.

7. The drum brake assembly defined in claim 2 wherein said first strut includes an automatic brake adjusting mechanism to compensate for wear of said first and second brake shoes.

8. The drum brake assembly defined in claim 2 wherein said pivot lever includes an aperture formed generally intermediate the ends thereof, said first brake shoe includes an aperture formed generally intermediate the ends thereof, and hold down means extends through said apertures of said pivot lever and said first brake shoe to secure said first brake shoe to said backing plate and to pivotally connect said pivot lever to said first brake shoe.

9. The drum brake assembly defined in claim 2 wherein said upper link of said second strut includes a first aperture formed therein, said lower link of said second strut includes a second aperture formed therein which is concentric with said first aperture, said actuating lever includes a third aperture formed therein, and a fastener extends through said first, second and third apertures to thereby pivotally support said actuating lever relative to said upper and lower links of said second strut.

10. The drum brake assembly defined in claim 2 wherein said actuating lever includes a first arm and a second arm, said first arm defining an actuating arm which is disposed adjacent an edge surface of said pivot lever, and said second arm defining an abutment which engages an outboard side surface of said second strut.

* * * * *